Patented Apr. 5, 1949

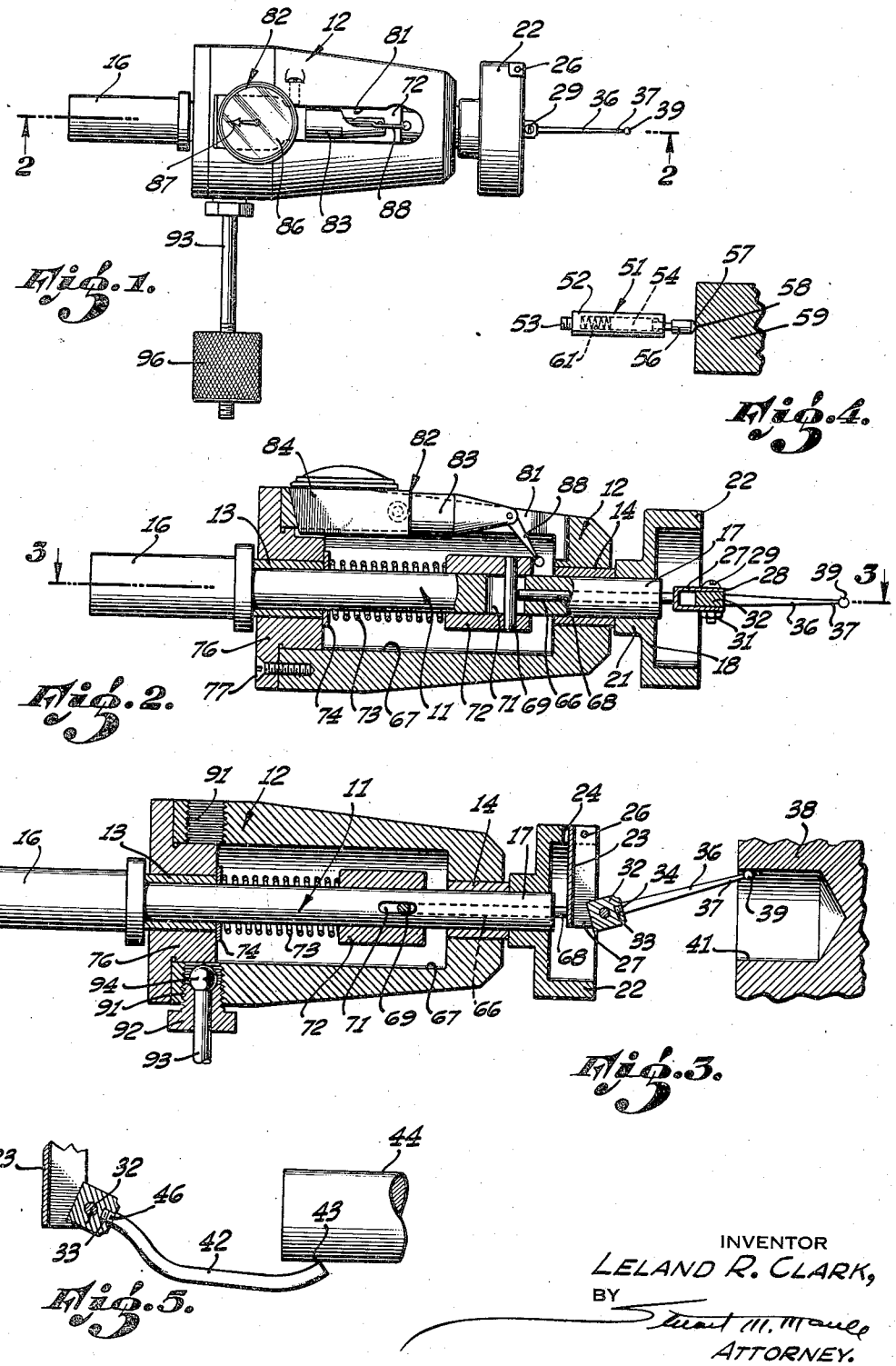

2,466,380

UNITED STATES PATENT OFFICE 2,466,380

PRECISION CENTERING DEVICE

Leland R. Clark, El Monte, Calif.

Application November 4, 1944, Serial No. 561,886

3 Claims. (Cl. 33—172)

This invention relates to machinists' tools and more particularly to precision gauges of the type commonly employed in positioning a piece of work on a machine with relation to the cutting tool of that machine so that subsequent operations performed by the tool will be located in exactly the desired portion of the work.

An object of my invention is to provide a machinist's gauge of the character indicated, the function of which is to afford convenience in locating work, or "setting up," as it is called in the trade, on machines wherein the cutting tool is carried by a rotating spindle, such as a drill press or jig-borer, wherein the step of "setting up" entails arranging the work with a certain predetermined point thereon in exact alignment with the machine's spindle.

A more detailed object of the present invention is to provide a centering gauge of the character indicated, which is adapted to be mounted directly upon the machine's working spindle, as by means of the chuck with which such machines customarily are equipped, thus facilitating aligning the gauge with the spindle's axis quickly and with extreme accuracy.

Another object is to provide an assortment of work-engaging feelers and means for mounting any selected one of them in operating position upon the gauge whereby the gauge is adapted for aligning a predetermined part of a piece of work with a machine operating tool, regardless of whether the part of the work so to be aligned is in the form of a center punch mark, crossed scribe marks, or a hole or a projecting pin of circular cross section.

Yet another object of my invention is to arrange the working parts of the gauge in such a manner that the indicating dial and the immediately associated portions of the device, while being fully sensitive to movements of the "pick up" finger, or work-engaging feeler, even though such movements may be of no greater magnitude than the smallest fraction of an inch of which cognizance is taken in even the most skilled and precise machine work, are fully protected from damage which otherwise might result from severe shock imparted to the feeler, such as that which the feeler might experience when the gauge is dropped or inadvertently struck with another tool or heavy piece of material.

It is a further object of the present invention to provide a centering gauge of the general character described which is extremely sensitive and precise in its operation, is relatively simple and inexpensive in construction, and is possessed of ample strength and ruggedness to insure practicable durability.

The invention possesses other objects and valuable features, some of which, with those enumerated, will be set forth in the following description of the preferred embodiment of my invention illustrated in the drawing accompanying and forming a part of the specification. It is to be understood that I do not limit myself to the showing made by said drawing and description but that I may adopt variations of the preferred form within the scope of my invention as defined by the claims.

Referring to the drawings:

Figure 1 is a view in side elevation of a centering gauge embodying the principles of the present invention.

Figure 2 is an enlarged view in longitudinal medial section taken upon the line 2—2 of Figure 1, with the direction of view as indicated. In this view the balance weight for holding the body of the tool stationary is omitted.

Figure 3 is a longitudinal medial sectional view taken upon the line 3—3 of Figure 2, with the direction of view as indicated, and showing the pointer, or "pick up" finger arranged within a hole, the axis of which constitutes the significant portion of the piece of work to be aligned with the spindle of the machine in which the centering gauge is mounted.

Figure 4 is a detail view showing a slightly modified form of "pick up" finger or pointer intended to be used in conjunction with a center punch mark or a pair of crossed scribe marks.

Figure 5 is a slightly enlarged view showing a still further modified form of "pick up" finger intended for use in conjunction with a projecting pin of circular cross section.

In the modification thereof chosen for illustration and description herein, the centering gauge of my invention comprises a shaft 11 disposed centrally of and extending through a body 12 which is journalled upon the shaft 11 as by axially aligned bushings 13 and 14. Both the inner and outer ends 16 and 17, respectively, of the shaft 11 extend beyond the associated ends of the body 12, the former thus presenting a shank adapted to be received within the chuck of a machine such as a drill press or jig-borer and thereby mount the entire centering gauge directly upon and accurately in co-axial alignment with the rotating spindle of that machine. The extended outer end 17 of the shaft 11 has a preferably circular head 18 rigidly secured thereto in any convenient manner, as by being press fitted thereon. An annular flange 22 extends outwards from the head 18; and an arm or lever 23 is pivoted within a slot 24 in the outer edge of the flange 22 as by a pintle pin 26 extending across the slot 24. The lever 23 extends radially inwards from the flange 22 and supports a mounting head 27 on its inner end substantially in alignment with the axis of the shaft 11. This mounting head conveniently takes the form of a pair of spaced flanges 28 interconnected by a screw 29 having a nut 31 threaded thereon so that a block 32 disposed between the flanges 28 may be pivotally mounted upon the screw 29 and may be yieldably retained by friction in any selected position of rotary adjustment about the axis of the screw 29, such frictional retention being attained by proper adjustment of the nut 31. In the outer face of the block 32 an interiorly threaded socket 33 is formed for the reception of the threaded end 34 of a "pick up" finger or feeler 36, the outer end 37 of which is adapted to engage the work 38, for the positioning of which with respect to the axis of the spindle upon which the gauge is mounted, the centering gauge of my invention is employed.

Since the feeler 36 is releasably secured to the block 32 by means of the threaded engagement described, various types of feelers may be supplied with the centering gauge, and the particular one best suited for any particular type of work may be selected. In Figures 1, 2, and 3 the type illustrated is provided with a ball 39 on its outer end, this being the type of feeler intended for use when setting up a piece of work 38 in such a manner that the axis of a hole or socket 41 of circular cross section is to be aligned with the axis of rotation of the machine's spindle.

Figure 5 illustrates a modified form of "pick up" finger or feeler adapted to be used in conjunction with a projecting pin or other projection of circular cross section, the axis of which is to be brought accurately into alignment with the axis of the machine's spindle. This "pick up" finger 42 comprises a short rod preferably more or less aduncate in form so that its outer end 43 is deflected inwards to facilitate engagement of the end of the finger 42 with the circular surface of the projection 44. The opposite end of the finger 42 is provided with a threaded male element 46 releasably engageable within the threaded socket 33 of the block 32 so as to mount the "pick up" finger 42 in operative position upon the lever 23.

Figure 4 shows a still further modified form of "pick up" finger or feeler 51 comprising a small cylindrical housing 52 having a threaded male element 53 at one end for mounting the pointer 51 upon the block 32. Within the hollow interior of the housing 52 a plunger 54 is reciprocably mounted with the outer end 56 of the plunger 54 projecting beyond the outer end of the housing 52 and provided with a relatively sharp point 57 adapted to seat within a center punch mark 58 in a piece of work 59. Retention of the point 57 within the center punch mark 58 is facilitated by means of a coil spring 61 under compression within the housing 52 and continually urging the plunger 54 outwards, i. e., to the right as viewed upon Figure 4. I have found in actual practice that by using a spring-urged plunger 54 as described and one whose point 57 is relatively sharp, a very shallow center punch mark 58 or even as slight a depression as that which is formed by a pair of intersecting scribe marks is sufficient to retain the point of the "pick up" arm 51.

An axial bore 66 extends inwards from the outer end 17 of the shaft 11 far enough to enter the hollow interior 67 of the body 12; and a push rod 68 is slidably mounted within the bore 66. The outer end of the push rod 68 abuts against the inner face of the lever 23, and the inner end of the push rod abuts against a transversally extending rod 69, the ends of which project through radial slots 71 in the shaft 11, and are rigidly connected to a sleeve 72 which is slidably mounted upon the exterior of the shaft 11. A coil spring 73 is under compression between the inner end of the sleeve 72 and a washer 74 which engages the inner face of a head 76 which closes the inner end of the body 12. The head 76 is removably secured in position upon the body 12 as by a plurality of counter-sunk machine screws 77, thus permitting easy access to the interior 67 of the body 12 to facilitate assembly of those portions of the device which are arranged thereinside. The coil spring 73 continually urges the sleeve 72 to its outer extreme of movement as determined by engagement of the transverse rod 69 with the distal ends of the slots 71.

An opening 81 in the wall of the body 12 forms a socket for the reception of a dial indicator 82; and whereas any suitable type of dial indicator may be employed, that which I have found most advantageous for use in connection with the centering gauge of the present invention is the one which can be purchased on the open market under the trade-mark "Last Word." Inasmuch as the details of construction of the dial indicator 82 form no portion of the present invention, it will suffice for the purpose of the present disclosure to explain that it comprises a substantially cylindrical body 83 having an enlarged head 84 at one end to accommodate a dial 86 and an index 87 movable with respect thereto in response to movement of a pivotally mounted finger 88 at the opposite end of the body 83 to which the index 87 is connected by suitable actuating mechanism (not shown). The actuating finger 88 of the dial indicator 82 engages the outer end of the sleeve 72, against which it is pressed by a spring (not shown) which is included in the dial indicator 82. Inasmuch as the push rod 68 is not positively connected to the lever 23 or to the transverse rod 69 but merely abuts thereagainst, it can cause movement of the sleeve 72 only to the left as viewed upon Figure 2, and the spring 73 is the only element which can cause movement of the sleeve 72 in that direction wherein it moves the finger 88 of the dial indicator 82. This is an important feature of my invention inasmuch as it prevents damaging of the dial indicator 82 even though some violent shock may be imparted to the push rod 68 as by dropping the entire instrument or by striking the "pick up" feeler or the lever 23 with another tool or with a relatively heavy piece of material.

Adjacent its inner end, the body 12 is provided with preferably a pair of interiorly threaded sockets 91 within either of which a tubular plug 92 is removably receivable. A rod 93 extends through the plug 92, being retained therein by a ball 94 on the inner end of the rod 93. A weight 96 (see Figure 1) is adjustably mounted upon the outer end of the rod 93. The function of the plug 92, rod 93 and weight 96 is to retain the body 12 from rotating by providing an unbalanced mass on its lower side when the centering gauge is mounted in axial alignment with a horizontally disposed spindle and thereby retain the dial indicator 82 substantially motionless even though the shaft 11 upon which the body 12 is supported is rotating with respect thereto.

*Operation*

As hereinabove explained, it is intended that the centering gauge of the present invention be mounted upon a machine such as a drill press or jig-borer with the shaft 11 accurately in axial alignment with the working spindle of that machine. The function of the centering gauge is to indicate whether or not a certain predetermined point on a piece of work 38 is accurately in alignment with the axis of the machine's spindle so as to enable the machinist operating the machine so to adjust the work upon the bed of the machine as to bring that point on the work accurately into alignment with the spindle, thus setting up the work 38 for the purpose of enabling the machine to perform a certain predetermined cutting or forming operation upon the work exactly in the desired location thereon. In accordance with the hereinabove description, if the point on the work 38 to be brought into alignment with the spindle's axis is indicated by a center punch mark, the "pick up" feeler 51 illustrated in Figure 4 should be selected and mounted upon the block 32 in the manner described. However, if the axis of a projecting pin or other projection of circular cross section constitutes the significant point on the work 38, then the "pick up" feeler 42 illustrated in Figure 5 should be employed, and when the axis of a cylindrical hole such as that indicated at 41 in Figure 3 is to be brought into alignment with the machine's spindle, then the "pick up" feeler 36 having a ball 39 at its outer end should be employed. As already explained hereinabove, the nut 31 should be tightened upon its screw 29 sufficiently to press the flanges 27 fairly tightly against the block 32 and thereby yieldably retain the block 32 and the "pick up" feeler 36 carried thereby in selected position with respect to the lever 23. As a consequence of this arrangement, any lateral movement of the "pick up" feeler 36 will be accompanied by rotary motion of the lever 23 about the axis of its pintle pin 26 until, of course, the lever 23 reaches the limit of its movement after which continued movement of the "pick up" feeler 36 in the same direction will be about the axis of its pivotal connection to the lever 23.

Assuming that the work being set up requires alignment of the axis of a hole such as that indicated at 41 with the axis of the machine's spindle, the work 38 should be placed tentatively in position upon the bed of the machine with the hole 41 as nearly axially aligned with the machine's spindle as conveniently can be accomplished by eye and the bed then adjusted to move the work 38 toward the centering gauge until the ball 39 at the end of the "pick up" feeler 36 enters the hole 41. The spindle of the machine then should be started in rotation with the outer end of the "pick up" finger slidably engaging the interior surface of the hole. Any deviation of alignment of the hole 41 with respect to the axis of the machine's spindle will cause the feeler 36 to move back and forth, i. e., to move laterally with respect to the axis of the shaft 11. However, since the rotary motion of the lever which accompanies lateral movement of the feeler 36 is about an axis which is offset laterally from the axis of the rotation of the shaft 11 and which lies in a plane to which the axis of the shaft 11 is perpendicular, any such lateral movement of the "pick up" feeler 36 likewise will be accompanied by motion of the push rod 68. That is to say, when the "pick up" feeler 36 moves downward as viewed upon Figure 3, the lever 23 will be caused to move inwards, i. e., to the left, pressing the push rod 68 inwards and carrying with it the sleeve 72. This will permit the finger 88 of the dial indicator 82 to move to the left as viewed upon Figure 2 in response to the action of its own motivating spring (not shown). When the "pick up" finger moves upward as viewed upon Figure 3, the lever 23 will swing outward, i. e., to the right, permitting the spring 73 to move the sleeve 72 and the push rod 68 outward, i. e., to the right, carrying with it the outer end of the finger 88 of the dial indicator. Thus it may be seen that any lateral movement of the "pick up" finger 36 will cause corresponding movement of the finger 88 of the dial indicator, which of course will produce corresponding movement of the index 87 over the face of the dial 86. Since the extent of such movement of the index 87 constitutes a measure of the distance which the axis of the hole 41 is offset from the axis of rotation of the machine's spindle, the machinist is enabled to adjust the work 38 upon the bed of the machine until the oscillation of the index 87 is reduced to zero at which time he will know that the axis of the hole 41 has been brought with extreme accuracy into alignment with the axis of rotation of the shaft 11 and the spindle of the machine upon which the centering gauge is mounted.

I claim:

1. A centering device of the character described comprising a shaft, a body journalled on said shaft, means associated with said shaft and extending beyond said body for mounting said centering device, means for restraining said body from rotating while said shaft rotates with respect thereto, a feeler pivotally mounted on said shaft for movement about an axis lying in a plane to which the axis of said shaft is perpendicular whereby lateral movement of said pointer with respect to said shaft results from rotation of said shaft while said feeler engages work at a point offset from the axis of said shaft, said feeler comprising a housing having a bore, a plunger reciprocally mounted therein with an end of said plunger projecting therefrom, and a spring under compression between said housing and plunger and urging said plunger outwards, and indicating means operably connected to said feeler and actuated by said lateral movement thereof.

2. A centering device of the character described comprising a shaft, a body journalled on said shaft, means associated with said shaft and extending beyond said body for mounting said centering device, said body having a pair of sockets on opposite sides thereof, means for restraining said body from rotating while said shaft rotates with respect thereto comprising a rod, means engageable optionally in either of said sockets for securing said rod to said body, and a weight carried by said rod, a feeler mounted on said shaft for pivotal and axial motion with respect thereto, and indicating means carried by said body and operably connected to said feeler to be actuated by axial motion of said feeler and including a dial facing outwards with respect to said body in a direction substantially perpendicular to a diameter of said body passing through both of said sockets.

3. A centering device of the character described comprising a shaft, a hollow body journalled on said shaft, means associated with said shaft and extending beyond said body for mounting said centering device, a feeler pivotally mounted on said shaft for rotary motion about an axis offset laterally from the axis of said shaft and lying in a plane to which said shaft's axis is perpendicular whereby lateral movement of said feeler about said axis of its pivotal mounting is accompanied by axial movement thereof, a push rod slidably mounted within an axial bore in said shaft and operably connected to said feeler to be reciprocated in response to axial motion thereof, a sleeve disposed within said hollow body and mounted for reciprocatory motion on said shaft, means connecting said sleeve to said push rod to be moved therewith, said body having a socket therein, an indicator comprising a body receivable within said socket, an actuating finger pivotally mounted on said body in position to extend into the path of movement of said sleeve when said indicator body is seated within said socket, and an index carried by said indicator body and operably connected to said actuating finger to be moved in response to movement thereof, and releasable means for locking said indicator body within said socket.

LELAND R. CLARK.

REFERENCES CITED

The following references are of record in the file of this patent:

UNITED STATES PATENTS

| Number | Name | Date |
| --- | --- | --- |
| 1,264,910 | Elsasser | May 7, 1918 |
| 1,373,319 | Ferrand | Mar. 29, 1921 |
| 1,424,310 | Krebs | Aug. 1, 1922 |
| 1,723,529 | Schweiterman | Aug. 6, 1929 |